(No Model.)

O. BENSON.
SUN DIAL.

No. 358,957. Patented Mar. 8, 1887.

WITNESSES:
A. Oakley
Helmer Westin

INVENTOR
Oliver Benson
BY A. W. Almqvist
ATTORNEY

UNITED STATES PATENT OFFICE.

OLIVER BENSON, OF EAST HINSDALE, NEW YORK.

SUN-DIAL.

SPECIFICATION forming part of Letters Patent No. 358,957, dated March 8, 1887.

Application filed July 12, 1886. Serial No. 207,765. (No model.)

*To all whom it may concern:*

Be it known that I, OLIVER BENSON, a citizen of Sweden, and a resident of East Hinsdale, in the county of Queens and State of New York, have invented a new and useful Improvement in Sun-Dials, of which the following is a specification.

The object of my invention is to furnish an improved sun-dial whereby a person may readily ascertain the time of the day, not only at the spot or place of the earth where he is at the time being, but also at any other place on the globe, thus making it useful as a comparative time-table, as well as an interesting and instructive instrument in teaching geography, &c.

The invention will be hereinafter fully described, and specifically pointed out in the claims, reference being had to the accompanying drawings, in which—

Figure 1:
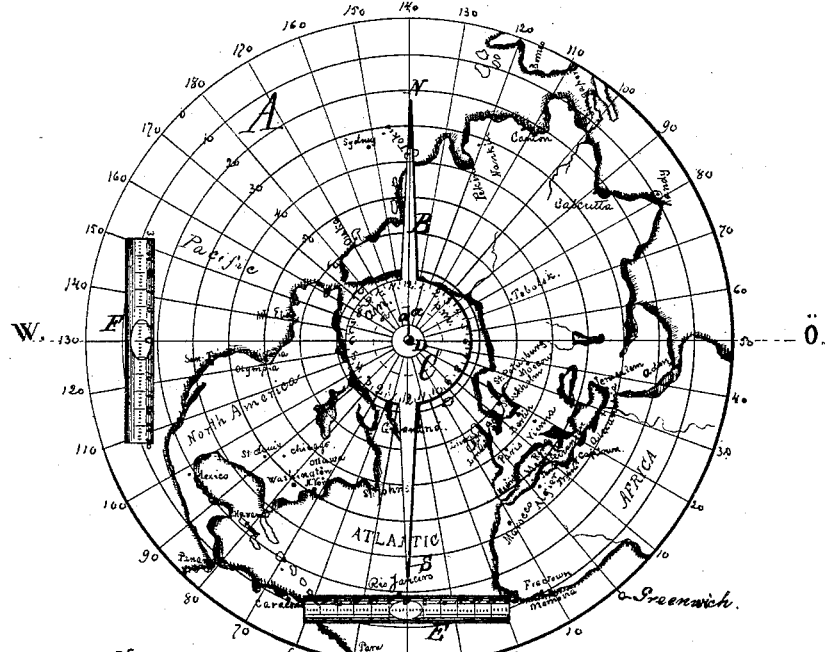
Figure 2:
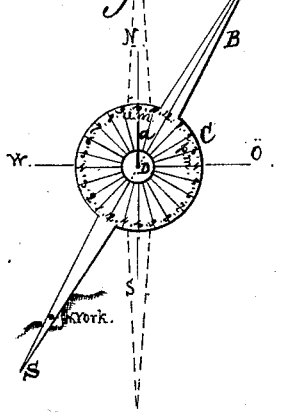
Figure 3:
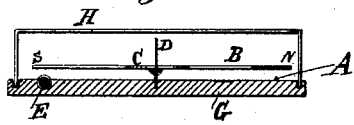

Figure 1 represents a plan view of my improved sun-dial. Fig. 2 is a detail view explanatory of how, after finding the meridian at any one place, the corresponding time at any other place may be found at once by simply moving the compass-needle so that the end thereof which is above the place in which the observation is made points to the latter place. Fig. 3 is a cross-section of the instrument.

A is a map or chart, of paper or any other suitable material, having located thereon, in their respective relative positions as to longitude and latitude, some of the principal cities and places of the earth, the map being a plan of the earth seen from the northern hemisphere, with the North Pole in the center, and divided up by meridian-lines.

The map should be smooth and straight. For this purpose, if of paper, it may be pasted on a smooth board, G, as in Fig. 3, and, in order to enable its adjustment in exact horizontal position it is provided with two liquid or spirit levels, E F, at right angles to each other, as is usual for like purposes; but in order to adapt this instrument even for the purpose of approximating inclinations, for instance, of an inch in a hundred or fifty feet, or other measure, (and thereby also ascertaining the angle of the inclination,) the glass tubes of the levels E F are provided with corresponding graduation-marks, and the amount of inclination is read by observing the location at the time being of the air-bulb in the glass tube relatively to one or other of the said graduation-marks.

B is the magnetized needle, free to move around a short vertical pin, D, in the North Pole or center of the map. The said pin D is also the index, its shadow *a* on the side opposite to the sun falling upon one or other figure on the ring-dial C denoting hours of the day. In this present case the said ring-dial C is not fixed, as heretofore, but is formed upon a circular enlargement or disk in the middle of the magnetized needle B, or otherwise attached, so that the dial-ring will move with the needle. The dial-ring C is divided by twenty-four equidistant graduations into as many equal parts denoting the hours of the day, "12, noon," being marked on the north and "12, midnight," on the south side of the central pin or pivot.

Looking at Fig. 1, the blackened end of the needle (marked N) is supposed to be pointing north and the other end (marked S) south. Consequently, toward the right is east, toward the left west, and as the earth is revolving eastward and the time of the day further advanced farther east, the hours *post meridiem*, from twelve noon to twelve midnight, are marked on the right semicircle of the dial-disk C, and the hours *ante meridiem*, from twelve o'clock midnight to twelve noon, are marked on the left semicircle of the said dial.

The operation of the instrument will be readily understood by a couple of illustrations, and it will be found that, although only the northern hemisphere is shown on the map A, the places in the southern hemisphere may also be marked and the time of their respective times found, so long as they are located correctly, with relation to latitude and longitude, below the equator, although in the plan view, Fig. 1, underlying northern places. Some places in the southern hemisphere I have, however, marked on the map A, such as Sydney, Australia, (see the square limited by meridian lines 150° and 160° east, and those of latitude 30° and 40° south,) Cape Town, (which will be found nearly opposite Tripoli,) and Rio Janeiro, (about 20° below the equator,) all in the southern hemisphere. Suppose a person is in Washington and wants to find the time in Sydney. He first levels the plate A and then turns it so that the needle B, when left free and turning north, will coincide with the meridian or line that passes through Washington; then, while allowing the plate A to remain stationary, he moves the S. end of the needle until it points to the dot which marks Sydney—i. e., the meridian line of Sydney—and the hour on the dial-ring C on which the shadow from the pin D falls indicates the time in Sydney. For instance, if his instrument shows twelve o'clock noon at Washington and he turns the needle as before stated, he will find that the index-shadow will fall on 3.13 p. m., as indicating the corresponding time in Sydney. If a person in Tokio, on Nipon, one of the Japanese Islands, has set the plate A in the meridian, as in Fig. 1, and finds the shadow of the index D falling on twelve o'clock noon, and he wishes to ascertain the corresponding time in any other place of the earth—for instance, in Rio Janeiro—he simply turns the N. end of the needle B to point to Rio Janeiro and he will find that the shadow indicates 11.50 a. m. on the dial; or, if he wants to find the time in New York, he simply moves the N. point of the compass over New York's meridian, and he will find that the shadow $a$ will indicate 10.06 p. m. on his dial; or, suppose if he finds the time in Tokio to be 2.14 a. m. and he wishes the time in Rio Janeiro, turning the point to the said city he will find it indicates 2.04 p. m.; turning it to New York, he will find its corresponding time to be twelve noon, and so forth.

The above illustrations seem abundantly sufficient to explain the use of the instrument.

The map A, when flat, and needle B may be protected by a glass cover, H, in which case the needle B is turned around by the use of a magnet, in a well-known manner.

Instead of making the map A flat, the same may be drawn or mounted upon a sphere, in which case the needle B should be curved to correspond to the curvature of the sphere; or, better, a fine circular wire band may be pivoted at the two poles of the sphere and provided at diametrically-opposite points with the north and south poles of the needle.

Having thus described my invention, what I claim as new, and desire to secure by Letters Patent, is—

1. A map of the earth seen from one of its poles and having indicated thereon the location of places with respect to meridians, and having, also, a pin, D, projecting from the said pole, in combination with the magnetic needle movable on the said pin and a dial of the hours of the day movable with the said needle around the said pole, substantially as and for the purpose set forth.

2. A map of the earth seen from one of its poles and having indicated thereon the location of places with respect to meridians, and having, also, a pin, D, projecting from the said pole, in combination with a magnetic needle provided centrally with a circular dial of the hours of the day and movable on the said pin, substantially as and for the purpose set forth.

3. A map of the earth seen from one of its poles and having indicated thereon the location of places with respect to meridians, and having, also, a pin, D, projecting from the said pole, and levels E F, graduated to indicate degrees of inclination, in combination with a magnetic needle movable on the said pin and a dial of the hours of the day movable with the said needle around the said pole, substantially as and for the purpose set forth.

4. A map of the earth seen from one of its poles and having indicated thereon the location of places with respect to meridians, and having, also, a pin, D, projecting from the said pole, in combination with a magnetic needle movable on the said pin and a dial of the hours of the day subdivided in two semicircular dials with the twelve p. m. hours at the right and the twelve a. m. hours at the left, the said dial being movable with the said needle around the said pole, substantially as and for the purpose set forth.

In testimony that I claim the foregoing as my invention I have signed my name, in presence of two witnesses, this 1st day of May, 1886.

OLIVER BENSON.

Witnesses:
A. W. ALMQVIST,
T. M. CROSSMAN.